Dec. 23, 1969  A. ROMANO  3,486,037
DEVICE FOR SENSING THE PRESENCE OF A LIQUID OR
VAPOR IN THE ATMOSPHERE
Filed June 16, 1966

United States Patent Office
3,486,037
Patented Dec. 23, 1969

3,486,037
DEVICE FOR SENSING THE PRESENCE OF A LIQUID OR VAPOR IN THE ATMOSPHERE
Adriana Romano, Via Scalfaro 3, Catanzaro, Italy
Filed June 16, 1966, Ser. No. 557,939
Claims priority, application Italy, Oct. 8, 1965, 22,211/65
Int. Cl. H01h 35/18, 35/42
U.S. Cl. 307—118                    7 Claims

ABSTRACT OF THE DISCLOSURE

A probe device for detecting the presence of moisture in the atmosphere in which first and second windings are wound on a core such that the turns thereof alternate and are in contact with one another to define cuspoidal grooves therebetween. Each winding includes an insulating layer which is present thereon over the region where adjacent turns contact one another, each winding being bare in the region outside said coating and being exposed to ambient atmosphere, such that upon presence of water in the grooves the windings are connected in closed circuit with a source of direct current connected to said windings and a utilization means also connected to said windings.

---

The present invention relates to electric devices or probes capable of undergoing operation in the presence of a liquid or a vapor in a given atmosphere, and therefore adapted to constitute the sensitive component of apparatus which measures or signals the presence of humidity, or of a circuit capable of automatically actuating mechanisms such as fans, windshield wipers and the like in the presence of drops or vapors.

The devices hitherto known in this field present the disadvantage of a slow reaction or response to the appearance or disappearance of said liquid drops or vapors.

Other known probes operate on the principle that the drops condensing between their electrodes establish an electric connection and thereby the flow of an electric current between them.

However, even the probes of the latter type present relatively sluggish responses and additionally the disadvantage of being subject to a very rapid corrosion, which very quickly reduces their sensitivity, causes short-circuits between their electrodes and thus their very quick deterioration.

It is an object of the present invention to provide an electric probe device, which is shock-resistant and capable of maintaining its sensitivity and quick response unaltered in time.

Another object of the present invention is to provide a probe whose sensitivity threshold is adjustable.

Another object of the invention consists in the production of a probe which is resistant to corrosion.

In the present invention these objects and advantages are realized by a probe device essentially comprising two conductors of any cross-sectional shape and made from a corrosion resistant material, said conductors being separated by a thin insulating layer and the first of which is connected to a source of direct current and the second to the operating circuit. A deposit of drops astride the insulating layer separating the two conductors will establish an electric contact between them and thereby permit the flow of a current from one towards the other.

Obviously the threshold of response or sensitivity of such a probe device can be adjusted by imparting a given temperature to the probe. As a function thereof, one may establish a predominance of the rate of condensation of the drops on said probe over the rate of evaporation of said drops or vice versa, in other words, the temperature will determine the ratio between liquid deposition and the evaporation of the liquid deposited and thus the minimum degree of humidity necessary for the establishment of an electric connection between the two conductors. At the instant the humidity in the atmosphere sinks below a predetermined level, the heat of the probe, and thus the evaporation it brings about, causes the quick interruption of the liquid connection between the two conductors. As a consequence thereof, the operating circuit will be inactivated.

The sensitivity of the present device may also be preadjusted by conveniently selecting the thickness of the insulating layer or of their cross-sectional shape.

The objects and advantages of the present invention will be better understood from the following description, given with reference to the attached drawing, of two embodiments thereof, it being understood that these embodiments are purely illustrative and in no way limitative to the present invention.

Figure 1:
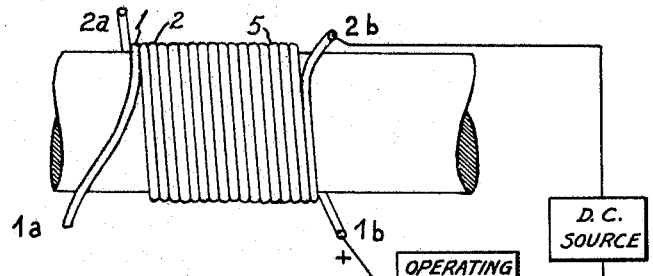
FIGURE 1 shows a probe with helical conductors.

The probe or detector shown in FIGURE 1 consists in a tubular or generally cylindrical support of insulating material, upon which two conductors 1 and 2 are wound. Both conductors are made from preferably mild stainless steel wire, coated with an insulating enamel layer 5. Both conductors 1 and 2 are wound upon the support S in the same sense, so that their respective coils alternate with each other in the manner shown in FIGURE 1, that is in such a manner that, except for their terminal coils, each coil of one conductor runs between two adjacent coils of the other, with the insulating coating 5 of each coil contacting that of the adjacent coils. After the winding of the two conductors upon the support S is completed, the enamel coating is completely removed from the radially more external surface of the two conductors 1 and 2, so as to expose their metal, as it is clearly visible from FIGURES 2, 3 and 4. The enamel can be removed in any known manner, using a solvent, mechanical means, etc., and care must be taken that not even a thin layer of enamel remains on the treated surfaces.

The end 1b of conductor 1 is connected to one pole of a source of direct current, while the end 2b of conductor 2 is coupled to the other pole of the source of direct current. An operating circuit or a relay closing said operating circuit is connected between the end 1b and the source of direct current.

If drops of a liquid form or fall upon the probe, until they fill the cuspoidal grooves 6 formed between adjacent wires, until they surpass the level of the enamel 5 in said groove, they will establish an electrically conducting contact between the uncoated parts of the wires, that is a contact between the coils of conductor 1 and the coils of conductor 2. Thus, a current will flow from the first to the second conductor throughout the duration of the contact formed by said drop.

The sensitivity of the device depends upon the depth of the grooves and thus, for conductors having a circular cross-section, upon their diameter. This results clearly from a comparison between FIGURES 2 and 3, which represent, on a strongly enlarged scale, conductors having circular sections of markedly different diameter.

Figure 3:
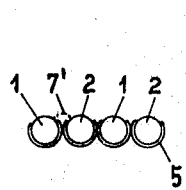
FIGURES 2, 3 and 4 are partial cross-sections, on an enlarged scale, of probes made with wires having different cross-sectional shapes and dimensions.
Figure 2:
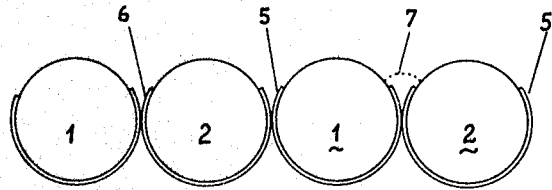
Figure 4:
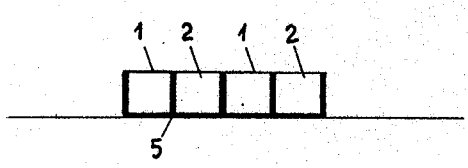
Figure 5:
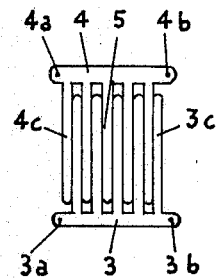
FIGURE 5 shows a probe made from laminar electrodes.

The size of the drops 7 necessary to fill the groove 6 between the two conductors of greater diameter shown in FIGURE 2 is considerably larger than the quantity 7' of liquid required to fill the grooves between the much smaller conductors of FIGURE 3. The amount of liquid necessary to straddle the insulation 5 between adjacent coils of the rectangular wire shown in FIGURE 4 or between the laminar electrodes 3c and 4c of the two laminar bundles 3 and 4 shown in FIGURE 5 is minimal, because in these two last embodiments the coating is flush with the bare metal surfaces of the conductors.

Since it is necessary that the electric contact between the two conductors cease as quickly as possible after the dampness of the atmosphere has sunk below a given level, the probe or detector must develop a certain amount of heat, in order to hasten the evaporation of the contact forming liquid. The degree of this temperature will also determine the threshold of response of the device in the manner already explained.

The detector or probe can be heated by a common electric resistor inserted within the support S and controlled by the probe itself, or by imparting the necessary resistance to the conductor I directly connected to the source of electricity.

The present probe lends itself to many applications, to detect or measure the appearance and disappearance of liquids or vapors in closed rooms or in the open or to actuate all kinds of operating circuits. In the number of its many applications, it has proven especially efficient in hygrometers and, conveniently connected with any type of windshild wipers, as a means to automatically start and stop their operation. In fact, if placed in a convenient position in front of the vehicle's windshield, it will automatically start the operation of the windshield wipers in the presence of such causes as rain, fogging of the windshield or spray of mud upon the latter, and will stop the circuit as soon as these causes have disappeared.

All these applications of the invention, and their manner of being carried into effect lie within the normal reach of those skilled in the art and for these reasons are here not particularly described.

What I claim is:

1. A probe device for detecting the presence of moisture in the atmosphere, said device comprising first and second conductors having lengths which alternate and are in contact with one another such that adjacent lengths define grooves therebetween, each conductor including an insulating coating which is present thereon over the region where adjacent lengths contact one another, each conductor being bare in the region outside said coating and being exposed to ambient atmosphere whereby each groove is at least in part bounded by the bare surfaces of adjacent lengths, a source of direct current connected to said conductors and a utilization means connected to said conductors for being energizing upon the presence of water in said grooves to connect the conductors in closed circuit with the source and utilization means.

2. A probe device according to claim 1, wherein the conductors have a rectangular cross-section.

3. A probe device according to claim 1, wherein each conductor consists of bundles of laminar electrodes which are laterally coated, the electrodes of one conductor being inserted between those of the other conductor and insulated from the latter by their lateral coatings.

4. A device according to claim 1 wherein said conductors are windings of circular cross-section and said grooves are of cuspoidal shape.

5. A device according to claim 4 wherein said insulating coating extends slightly beyond the points of contact between adjacent turns of the windings whereby the cuspoidal grooves exposed to the ambient atmosphere are partly bounded by the insulating coating.

6. A device according to claim 1 comprising means for heating the conductors to vary the sensitivity of the probe.

7. A device according to claim 6 wherein said heating means comprises a source of current connected to one of said conductors.

References Cited

UNITED STATES PATENTS

| | | | |
|---|---|---|---|
| 2,234,858 | 3/1941 | Brown et al. | 73—336.5 X |
| 2,381,299 | 8/1945 | McCulloch | 338—35 |
| 2,563,341 | 8/1951 | Kettering | 200—61.05 |
| 2,647,234 | 7/1953 | Pear | 73—336.5 X |
| 2,742,541 | 4/1956 | Bunting | 200—61.06 |
| 3,056,935 | 10/1962 | Jensen | 73—335 X |
| 3,243,891 | 4/1966 | Smith | 338—34 X |

ROBERT K. SCHAEFER, Primary Examiner

T. B. JOIKE, Assistant Examiner

U.S. Cl. X.R.

200—61.06; 338—34